(No Model.)
C. J. KLEESPIES.
FILTER AND CUT-OFF FOR RAIN WATER.
No. 542,934. Patented July 16, 1895.
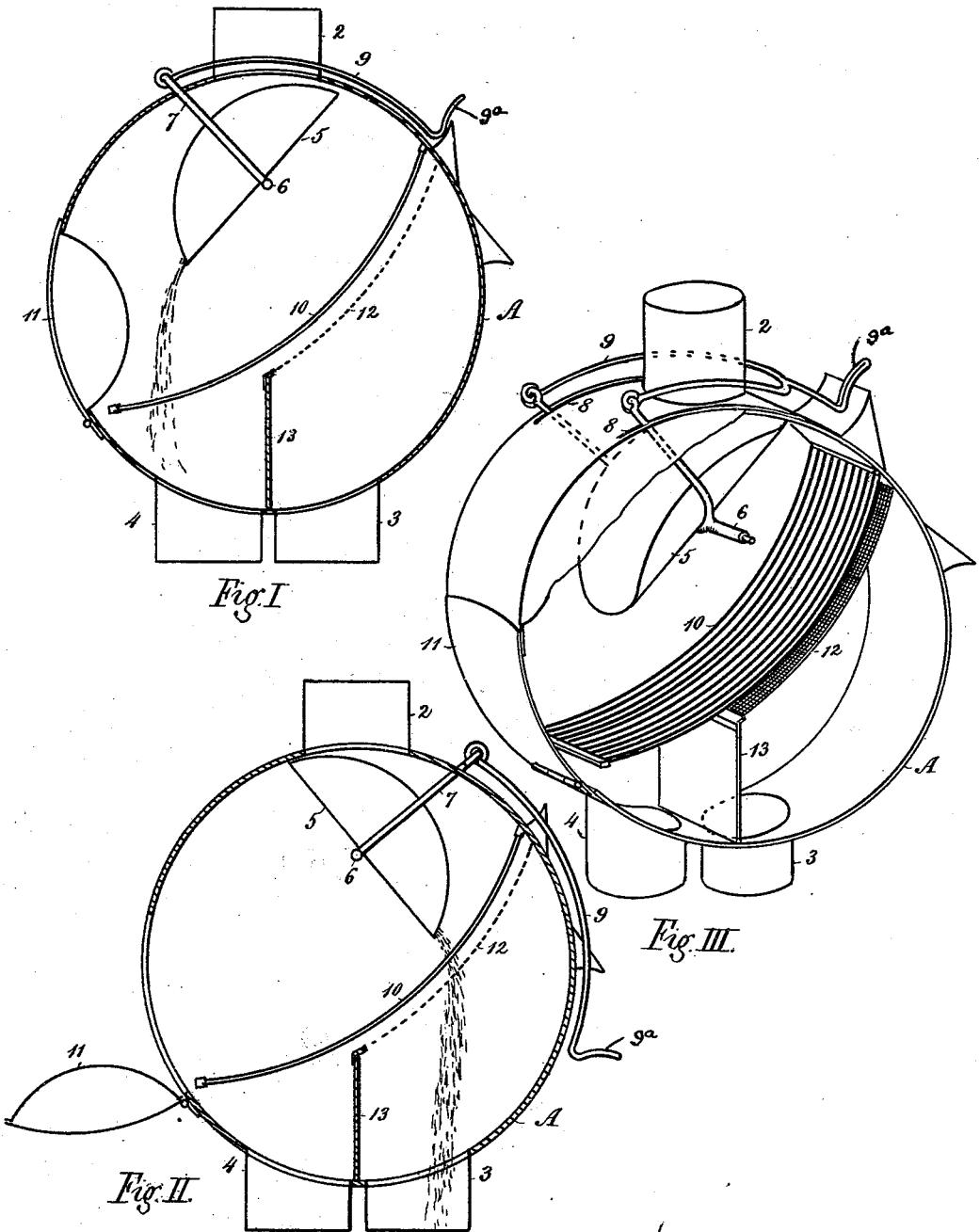

UNITED STATES PATENT OFFICE.

CHARLES J. KLEESPIES, OF HARTWELL, OHIO.

FILTER AND CUT-OFF FOR RAIN-WATER.

SPECIFICATION forming part of Letters Patent No. 542,934, dated July 16, 1895.

Application filed March 14, 1895. Serial No. 541,689. (No model.)

*To all whom it may concern:*

Be it known that I, CHARLES J. KLEESPIES, a citizen of the United States, residing at Hartwell, in the county of Hamilton and State of Ohio, have invented a new and useful Improvement in Filters and Cut-Offs for Rain-Water, which improvement is fully set forth in the following specification and accompanying drawings, in which—

Figure I is a central vertical section of my improved rain-water filter and cut-off, showing the water escaping through the waste-pipe; Fig. II, the same view showing the water diverted and passing through the screen and filter and into the cistern, and Fig. III a perspective view showing the location of the screen and filter.

My invention relates to an improved apparatus for purifying rain-water for domestic purposes, and its primary object is to provide a simple, reliable, and durable device whereby the water may be thoroughly filtered before being admitted into a cistern, or, if desired, excluded therefrom when unsuitable.

A secondary object is to avoid the expense attending the frequent cleaning of cisterns which are not provided with means for preventing the admission of foul matter.

The peculiar construction of the device and its several advantages will be readily understood by referring to the accompanying drawings, in which A designates a drum made of suitable sheet metal, having on top an inlet-pipe 2 and on the under side a cistern-pipe 3 and waste-pipe 4. A cut-off 5, in the form of a double-ended scoop, swings beneath the inlet on a shaft 6, the ends of which are journaled in suitable bearings affixed to the inner sides of the drum. Arms 7 are attached to the outer sides of the cut-off and extending outwardly through slots 8 in the rim of the drum are pivotally attached to the ends of a wire yoke 9, by means of which the cut-off may be readily adjusted and secured in the desired positions, as shown in Figs. I and II.

The yoke is formed at its extremity with a finger-hold 9ª, which is adapted to engage with two approximately-triangular stops on the periphery of the drum.

A screen or grating 10, composed of longitudinally-arranged wires, extends diagonally downward through the interior of the drum and arrests leaves, twigs, or other rubbish that may come down the spout. The smaller particles can escape into the waste-pipe. If there should be any accumulation of such matter it may be removed through the trap-door 11. Directly beneath and parallel with the screen is a filter 12, composed of incorrodible wire-gauze, the lower end of which rests on the top of a partition 13, which separates the outlet-pipes 3 and 4.

The operation of the device will be readily understood. When the cut-off is in the position shown in Fig. I, the first fall of rain passes into the waste-pipe. When the roof becomes washed the cut-off is reversed and the stream is deflected against the inclined surfaces of the screen and filter, through which it passes into the cistern. It will be observed that if by reason of neglect the cut-off should be allowed to remain in the receiving position, as shown in Fig. II, any bulky matter accompanying the first fall of rain would be carried past the cistern-pipe by the screen, and smaller particles, instead of passing through the filter, would be washed down its inclined surface and pass into the waste-pipe.

What I claim as new is—

1. In a water cut off and filter, the combination with the drum, the inlet pipe and the outlet pipes of the reversible cut off, pivoted to the drum and the yoke connected therewith provided with a finger hold, of the curved bars with spaces therebetween, the screen located below said bars and extending from one side of the drum to about the center thereof and the partition located between the outlet pipes, substantially as described.

2. In a water cut off and filter, the combination with the drum, the inlet and outlet pipes, the peripheral approximately triangular shaped stops, the pivoted reversible cut-off and the yoke provided with a finger hold, of the curved bars with spaces therebetween, the screen located below said bars and extending from one side of the drum to about the center thereof, the partition located between the outlet pipes and the trap door, substantially as described.

In testimony that I claim the foregoing I have hereunto set my hand, this 9th day of March, 1895, in the presence of witnesses.

CHARLES J. KLEESPIES.

Witnesses:
CHAS. E. PRIOR,
WM. A. RINCKHOFF.